United States Patent [19]

Brahm et al.

[11] Patent Number: 4,865,801
[45] Date of Patent: * Sep. 12, 1989

[54] SHIELDING DEVICE

[75] Inventors: Leroy D. Brahm, Gibbsboro, N.J.; Frank C. Brown, Pequea; David F. Ciarlone, Devon, both of Pa.; Mark R. Dedrich, Bel Air, Md.; James B. Hassall, Morrisville, Pa.; Fedor M. Salva, Voorhees, N.J.

[73] Assignee: Brahm, Brown, et al., Devon, Pa.

[*] Notice: The portion of the term of this patent subsequent to Oct. 13, 2004 has been disclaimed.

[21] Appl. No.: 80,820

[22] Filed: Aug. 3, 1987

Related U.S. Application Data

[63] Continuation of Ser. No. 775,581, Sep. 13, 1985, Pat. No. 4,699,752.

[51] Int. Cl.[4] .............................. G21C 11/00
[52] U.S. Cl. .................................. 376/260
[58] Field of Search ................ 250/515.1, 517.1; 376/260, 287, 288, 289

[56] References Cited

U.S. PATENT DOCUMENTS

| | | | |
|---|---|---|---|
| 2,920,025 | 1/1960 | Anderson | 376/287 |
| 3,150,051 | 9/1964 | Ammon | 376/287 |
| 3,239,422 | 3/1966 | Campbell | 376/219 |
| 3,752,737 | 8/1973 | Frisch et al. | 376/287 |
| 3,914,613 | 10/1975 | Shallenberger | 376/261 |
| 4,071,404 | 1/1978 | Aoki | 250/515.1 |
| 4,092,546 | 5/1978 | Larrabee | 250/515.1 |
| 4,299,658 | 11/1981 | Meuschke et al. | 376/260 |
| 4,360,736 | 11/1982 | Weissenfluh | 376/287 |
| 4,432,932 | 2/1984 | Jacobson | 376/287 |
| 4,530,813 | 7/1985 | Jacobson | 376/287 |
| 4,574,070 | 3/1986 | Blaushild et al. | 376/287 |
| 4,673,546 | 6/1987 | Casteen et al. | 376/289 |
| 4,699,752 | 10/1987 | Brahm et al. | 376/260 |
| 4,708,843 | 11/1987 | Desfontaines et al. | 376/289 |
| 4,729,869 | 3/1988 | Schukel et al. | 376/287 |
| 4,733,092 | 3/1988 | Jacobson et al. | 376/287 |

FOREIGN PATENT DOCUMENTS

| | | | |
|---|---|---|---|
| 1162334 | 2/1984 | Canada | 376/287 |
| 0131168 | 1/1985 | European Pat. Off. | 376/287 |
| 2100496 | 12/1982 | United Kingdom | 376/260 |

Primary Examiner—Stephen C. Bentley
Assistant Examiner—Richard W. Wendtland
Attorney, Agent, or Firm—Robert Charles Beam

[57] ABSTRACT

A shielding device is disclosed for use in the under-vessel area from radiation emanating above the lower terminus of a control rod drive of a power generating nuclear reactor of the boiling water type. The device may be comprised of a plurality of individually mountable shell-like housings which are joined in mating contiguous relation to surround the lower terminus of a control rod drive. In the preferred embodiment, each such device is provided with an intergrated access door which will allow access to and removal of any connectors and cables such as those of a position indicating probe.

48 Claims, 3 Drawing Sheets

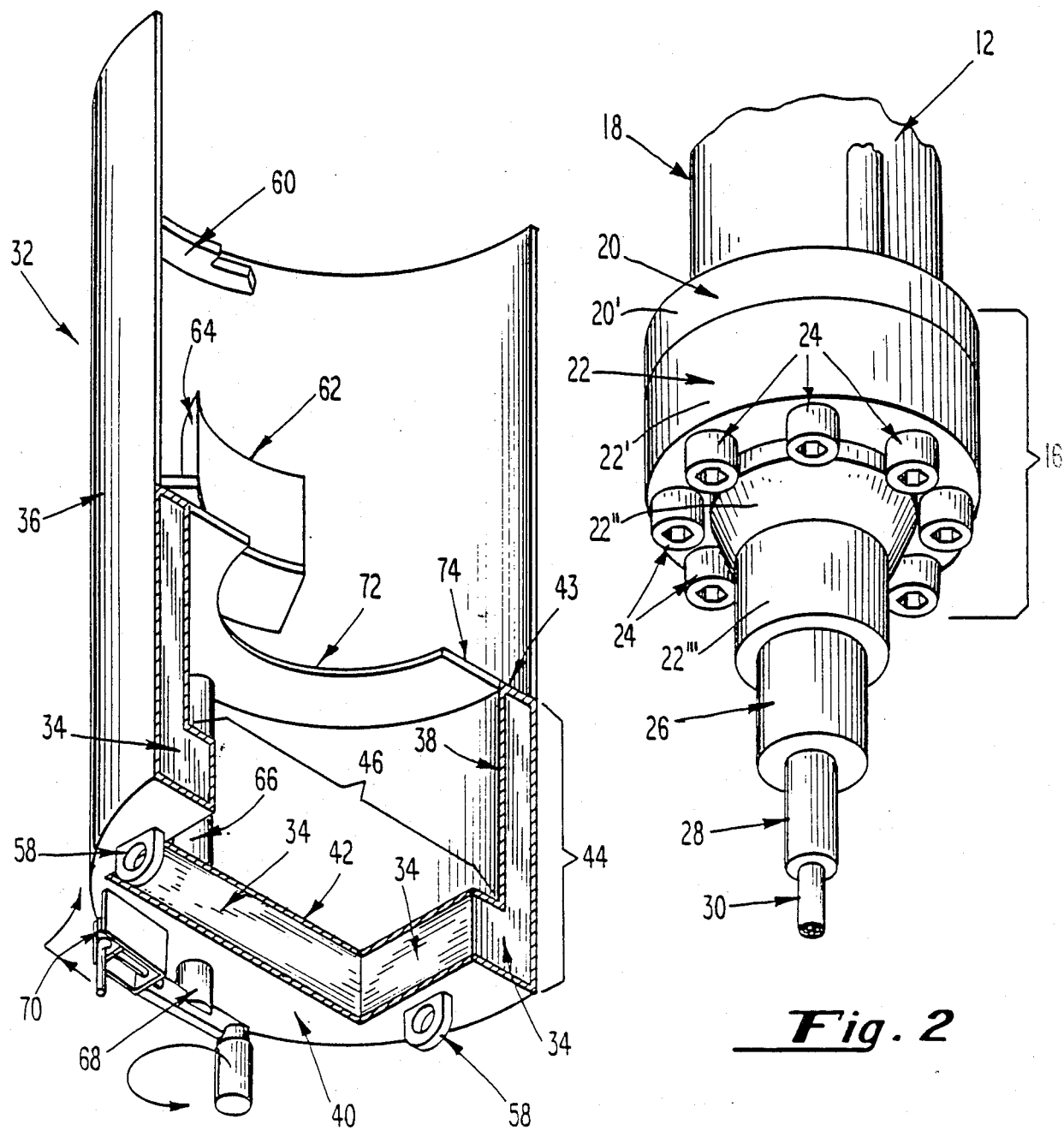

SHIELDING DEVICE

This is a continuation of application Ser. No. 06/775,581, filed Sept. 13, 1985 now issued as U.S. Pat. No. 4,699,752.

FIELD OF THE INVENTION

The present invention relates to a shielding device for use in shielding the under-vessel area from radiation emanating above the lower terminus of a control rod drive of a power generating nuclear reactor of the boiling water type.

BACKGROUND OF THE INVENTION

The nuclear reaction in a power generating nuclear reactor of the boiling water type, also referred to as a boiling water reactor, is controlled by a set of hydraulically actuated bottom-entry control rods. The control rod drive pistons enter the pressure vessel of the reactor through vertical penetrations in the lower plenum of the reactor known as control rod drive housings. These housings extend below the pressure vessel of the reactor far enough to provide the pistons sufficient travel so that the control rods may be completely withdrawn from the reactor fuel core.

At the bottom of each housing, the hydraulic actuation mechanisms for each piston are bolted to the housings with flange connections. These flange connections are typically secured by eight socket head capscrew bolts that are symmetrically located around the control rod drive flange.

The hydraulic actuation lines, sometimes referred to as insert/withdraw lines, enter the flange assembly through ports which are typically located on the top surface of the control rod drive housing flange.

Control room reactor operators must know the vertical position of each control rod at all times. Magnets located on the bottom of the control rod drive pistons, when sensed by an electronic probe, provide this information to the operator for each control rod. These electronic sensors, or position indicating probes, send their signals to the control room through the probe cables which are plugged into probe housings at the bottom of each control rod drive.

The flange assemblies contain a number of hydraulic components which relate to the actuation of the control rod drive pistons. During use, reactor coolant is employed as the working fluid flowing through these hydraulic components. Particulate debris consisting of neutron-activated corrosion products and wear fragments, as well as the water soluble radioactive contaminants that result from normal plant operations tend to accumulate in the hydraulic system. The particulate debris is from the alloys that are present in the various piping systems and internal components in a boiling water reactor. The water soluble radioactive contaminants carried by the reactor coolant through the flange assemblies are either fission products which have leached through the small perforations of failed fuel rods or materials that become radioactive through neutron-activation.

None of the materials used in the piping or other reactor structural components are radioactive when they are installed. However, as a result of normal use, these structures and components will tend to accumulate radioactive contaminants, and will eventually become sources of radiation themselves. Many of the materials used in the piping and structural components are subject to corrosion, friction and wear, and these processes release metallic particulates into the reactor coolant. The reactor coolant carries these particulates throughout the entire system. While the reactor is operating, a very dense flux of neutrons is present in the reactor's fuel core, and the particulates and contaminants carried by the coolant are exposed to this neutron flux. When a high-energy neutron collides with an atom of any material, the atom is typically transmuted into a new species, and in nearly all cases the transmuted atom is unstable or radioactive. This process is known as neutron-activation. It is through neutron activation such as this that the particulates and contaminants in the reactor coolant are made radioactive. Eventually, the particulates and contaminants in the coolant accumulate in regions of slow flow or plate-out onto attractive surfaces which are contaminated with radioactivity in this manner. Because these particulates and contaminants are often carried through the reactor fuel core many times before settling or plating-out, nearly all of them have experienced neutron activation. It is through this cycle of (1) corrosion, friction or wear related deposition into the reactor coolant; (2) neutron activation; and (3) sedimentation, accumulation or plate-out that the piping and other reactor components eventually become contaminated with radioactive materials.

The neutron activation process in a nuclear reactor of the boiling water type produces a great number of radioactive nuclides. Most of these radioactive nuclides are derived from the constituent elements of stainless-steel or any other alloy present, such as brass, if brass is present in the condenser tubing of the reactor. Typical nuclides are the several radioactive isotopes of Cobalt, Copper, Iron, Manganese, Nickel, Tin and Zinc. The radioactive water soluble contaminants will typically consist mostly of the various radioactive isotopes of Cesium and Iodine. However, in practice, one single nuclide, Cobalt-60 or Co-60, dominates the total radiation produced by all others to such a degree that practical experience has shown that shielding can be designed substantially as if that were the only nuclide present.

Cobalt is often used in industrial applications to increase the toughness of various alloys. Essentially all of the naturally occurring Cobalt is the stable and non-radioactive isotope Co-59. When Co-59 is carried by the Reactor Coolant through the fuel core the neutron activation process typically yields the radioactive nuclide Co-60. Decay of Co-60 emits radiation in the form of a simultaneous pair of gamma photons with energies of 1.17 MeV and 1.33 MeV, and its half-life is roughly 5.25 years. Metallic lead is an excellent shielding material for this type of radiation.

As these radioactive materials accumulate on the interior surfaces of the reactor vessel, the control rod drive housing and the flange assemblies, these components themselves become intense sources of radiation of all forms, i.e., alpha particles, beta particles and gamma photons. In addition, the outer surfaces of these components can become contaminated from other sources, such as the release of radioactive contaminants caused by the deluge of water from an adjacent control rod drive. In practice, however, only gamma radiation, dominated by the two high-energy Co-60 photons, can penetrate the thick stainless-steel walls of the flange assembly. The resulting contact dose rates for these components, even months after reactor shutdown, routinely range as high as ten Roentgen Equivalent Man (10 rem) per hour and can be substantially higher in certain cases. A Roentgen Equivalent Man (rem) is the most common unit employed to measure radiation dose rates and is usually defined as that quantity of any type of ionizing radiation which when absorbed by man, produces an effect equivalent to the absorption by man of one Roentgen of X- or gamma radiation. A Roentgen is that quantity of X- or gamma radiation such that the associated corpuscular emission per 0.001293 grams of air produces, in air, ions carrying one electrostatic unit of quantity of electricity of either sign. Because of the close proximity of the flange assemblies to the under-vessel workers doing routine maintenance and replacement work, radiation dose rates may range from 0.3 to 0.7 rem per hour to the whole body, which is defined as the trunk, head and lens of eyes, of each worker.

The U.S. Nuclear Regulatory Commission has issued regulations governing the operation of all nuclear facilities. These regulations appear at Title 10 of the Code of Federal Regulations. In Part 20, Section 101, Paragraph (a), 10 CFR 20.101(a), the regulations currently restrict occupational doses to the whole body of a worker to a standard of 1.25 rem per calendar quarter, although the concept of 'dose banking' as that term is used in 10 CFR 20.101(b), presently permits worker exposure of up to 3.00 rem per calendar quarter under very restrictive circumstances. However, the philosophy of "As Low As Reasonably Achievable", or ALARA, as it is embraced by both the Nuclear Regulatory Commission and the nuclear industry in general, motivates most reactor operators to limit occupational doses to much lower levels.

Routine under-vessel maintenance performed during boiling water reactor refueling outages can typically require from 600 to over 1000 man-hours to complete. Unfortunately, the large dose rates which can be caused by the close proximity of the flange assemblies make it possible for an under-vessel worker to receive his entire quarterly dose allowance in just a few hours. Such workers, who have used their allowable dose limit, are not permitted to work in areas where they may be exposed to any further radiation. Under-vessel maintenance work, as currently practiced, is not only a radiological safety concern, it is also a very serious manpower management problem as well.

OBJECT OF THE INVENTION

It is an object of the invention to provide a shield device for shielding the lower terminus of a control rod drive in a power generating nuclear reactor of the boiling water type.

It is another object of the invention to provide a method for reducing the exposure of workers to radiation during under-vessel maintenance and replacement work.

The other objects, features and advantages of the present invention will become more apparent in light of the following detailed description of the preferred embodiment thereof.

According to the present invention, there is provided a shielding device for us in shielding the under-vessel area from radiation emanating from above the lower terminus of a control rod drive of a power generating nuclear reactor of the boiling water type, which control rod drive has a flange assembly comprised of a control rod drive housing flange and a mating control rod drive flange joined together by bolting means, which shielding device comprises:

an effective amount of shielding material having a suitable geometry, and means to hold said shielding material in position shielding the under-vessel area from said radiation.

According to another embodiment of the present invention, there is provided a method for reducing the exposure of workers to radiation emanating from above the lower terminus of a control rod drive during under-vessel maintenance and repair work on a power generating nuclear reactor of the boiling water type, which method comprises:

(a) attaching to the lower terminus of each control rod drive, a shielding device which comprises an effective amount of shielding material having a suitable geometry, and means to hold said shielding material in position shielding the under-vessel area from said radiation;

(b) performing the maintenance or repair work; and (c) removing said shielding device from each control rod drive.

According to a preferred embodiment of the present invention, there is provided a shielding device, for use in shielding the under-vessel area from radiation emanating from above the lower terminus of a control rod drive of a power generating nuclear reactor of the boiling water type, which control rod drive has a flange assembly comprised of a control rod drive housing flange and a mating control rod drive flange joined together by bolting means, which shielding device comprises:

a plurality of shielding members wherein (a) each said shielding member is comprised of:

(i) a cylindrical outer wall of a non-corrosive metallic substance, said outer wall having a vertical length which extends from a point just above the control rod drive flange assembly downward for a suitable distance, and which outer wall has an inside radius of curvature substantially equal to the outside radius of said control rod drive flange assembly, (ii) an annular outer bottom wall of a non-corrosive metallic substance, said outer bottom wall joining and fixedly attached to said outer wall at the lower periphery of said outer wall, said outer bottom wall having an opening therethrough, which is central to the complete annulus, (iii) a first cylindrical inner wall of a non-corrosive metallic substance, said first inner wall extending downward from a point just below the flange assembly, said first inner wall member having an outside radius of curvature smaller than the radius of curvature of the outer cylindrical wall by an amount great enough to define a partial cylindrical chamber therebetween, which partial cylindrical chamber is large enough to accommodate an effective amount of shielding material therein, (iv) an annular inner bottom wall of a non-corrosive metallic substance fixedly attached to said first inner wall, said inner bottom wall disposed above said outer bottom wall by a distance great enough to define a partial annular chamber, which partial annular chamber is large enough to accommodate an effective amount of shielding material therein, said inner bottom wall having an opening therethrough, which opening is central to the complete annulus, (v) an annular upper interior wall of a non-corrosive metallic substance fixedly attached to the interior surface of said outer wall and the upper periphery of said first inner wall, thereby defining a top to said partial cylindrical chamber, (vi) a second cylindrical inner wall of a non-corrosive metallic substance fixedly attached to the interior periphery of said outer bottom wall and said inner bottom wall, thereby defining an interior wall of said partial annular chamber, said second cylindrical inner wall partially defines a central opening of the complete annulus which opening is of large enough dimension to accommodate any control cables or connectors, (vii) two radial walls of a non-corrosive metallic substance, which radial walls enclose the radial edges of said partial cylindrical chamber and said partial annular chamber, and are fixedly attached to the second cylindrical inner wall, the outer bottom wall, the inner bottom wall, the first inner cylindrical wall, the upper interior wall and the outer wall, thereby enclosing both the partial cylindrical chamber and the partial annular chamber, (viii) an effective amount of shielding material disposed within said partial cylindrical chamber, and (ix) an effective amount of shielding material disposed within said partial annular chamber;

(b) each said shielding member is provided with attachment means comprising:

(i) a first contact point which comprises an inward-facing partial rim or lip fixedly attached to the upper periphery of said outer wall; and (ii) a second contact point which comprises an upwardly adjustable wedge-shaped member which can be positioned on the under side of the control rod drive flange, interior to said bolting means; and (c) each said shielding member has a suitable geometry such that, when said plurality of shielding members are assembled in mating contiguous engagement, they surround and enclose the lower terminus of said control rod drive with an effective amount of shielding material.

BRIEF DESCRIPTION OF THE DRAWINGS

FIG. 2 shows a control rod drive in the area of the control rod drive flange assembly.

FIG. 3 is a partly broken away view of the shielding member employed in the present invention.

DETAILED DESCRIPTION OF THE INVENTION

Figure 1:
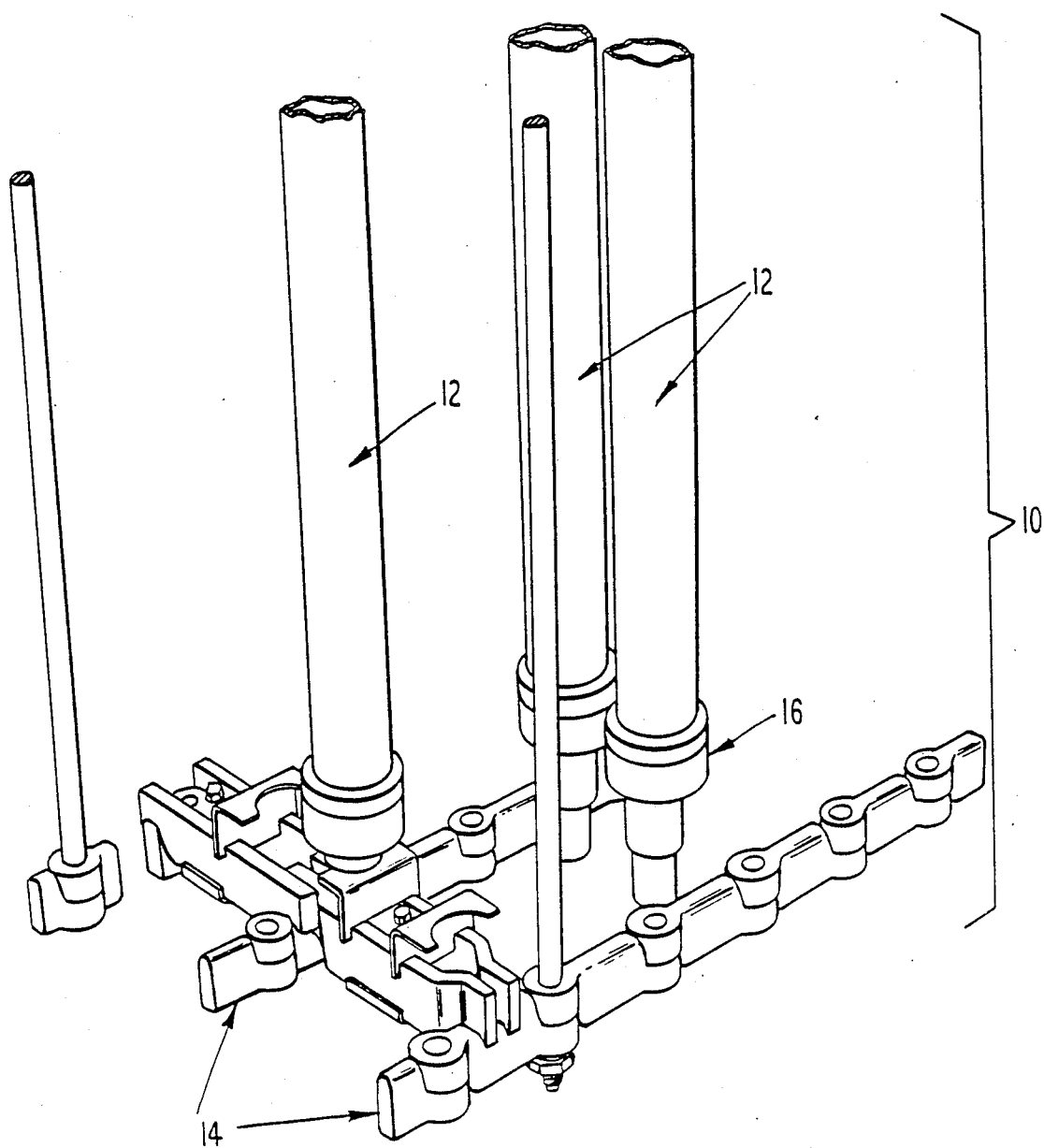
FIG. 1 depicts the under-vessel area of a power generating nuclear reactor of the boiling water type, showing a number of control rod drives and assembly of the control rod drive housing support members.

FIG. 1 depicts the mechanical area immediately above the under-vessel maintenance area, which mechanical area is shown generally as (10), of a power generating nuclear reactor of the boiling water type. Shown in this mechanical area (10) are a number of control rod drives (12) and the assembly of the control rod drive housing support members (14). When maintenance or replacement work is done during a reactor shutdown, the control rod drive housing support members (14), also referred to as the shoot-out steel assembly, is normally disassembled and removed as a first step.

The exposure to radiation emanating from the flange assemblies (16) of the control rod drives and from the components above these assemblies, limits the work time available for such maintenance work unless such radiation can be effectively shielded.

FIG. 2 shows a control rod drive (12) in the area of the control rod drive flange assembly (16). The control rod drive housing (18) terminates at its lower end in a control rod drive housing flange (20), which mates with a control rod drive flange (22) to form the flange assembly (16). These flanges are secured together by some form of bolting means (24) as illustrated by the eight capscrews in FIG. 2.

Below the control rod drive flange (22), the connections for a position indicating probe are located, as shown by the probe housing (26), the probe connector plug (28) and the probe cable (30). After the control rods have been raised and locked in their fully inserted positions within the reactor vessel, these components are normally disconnected in routine maintenance work, and are inspected and periodically replaced as necessary.

Many design considerations were applied in the design of the shielding device of the present invention, particularly the design of the preferred embodiment of the present invention.

These design considerations include:

1. The primary purpose of the shielding device should be to reduce the radiation doses to under-vessel maintenance personnel to levels as low as reasonably achievable.

2. The shielding device should place the maximum practical amount of shielding material between the radiation emitted and the worker.

3. The shielding device should be reasonably portable. That is, it must be light enough in weight and have a suitable shape to permit it to be carried by under-vessel workers wearing anti-contamination clothing, respirators and heavy gloves while they walk, bend and crouch.

4. Ideally, each portion of the shielding device should not weigh more than 50 to 65 pounds.

5. The shielding device should be mechanically designed so that it is capable of supporting all of its own weight structures and attachments without reliance on external sources of support and without any deformation or loss of function.

6. The shielding device should be installed and removed easily by under-vessel workers wearing anti-contamination clothing, respirators and heavy gloves.

7. The shielding device should feature installation and removal mechanisms that are easily accessible to the under-vessel workers, and that do not require access to the top or the side of the device. In fact, all mechanisms of the device should be accessible from the bottom of the device.

8. The shielding device should be quickly and easily installed. Hence, the installation of the device should be completely indifferent to the orientation of the device around the flange assembly.

9. While the shielding device should minimize the unshielded gamma radiation from the flange assembly, it should also allow the maximum head room to under-vessel workers. The shielding device should, therefore, be positioned close to the flange assembly.

10. The shielding device should not interfere with any other under-vessel components nor the flange assembly of any other control rod drive. Therefore, the outer diameter of the shielding device should be made as close as possible to the outer diameter of the flange assembly, and all exterior surfaces should be smooth.

11. The shielding device, when secured to the flange assembly or while being installed or removed, should not cause any harm to the flange assembly, or its electrical or mechanical components. Therefore, the shielding device should not impose any loads upon, and should preferably not even be in contact with, the hydraulic actuation lines or the position indicating probe components of each control rod drive.

12. The shielding device and any individual members thereof should not impose any safety hazards to under-vessel workers. Therefore, the method of attaching each component of a shielding device to the flange assembly should be independent, secure, stable and positive. The shielding device should remain secured to the flange assembly in the event of any accidental impact it might receive in the course of any under-vessel maintenance. Removal of the shielding device should require a series of deliberate actions that would not be likely to be performed without the intention of removing the device, or any of its components, from its secured position.

13. The shielding device should be able to function and be installed and removed independent of the presence of a position indicating probe cable. In its preferred embodiment, the shielding device should not require disconnection of the position indicating probe cables, but should allow such disconnection and reconnection without complete removal of the shielding device.

14. The shielding device, when installed, should allow ample access to the probe cable and connector plug, as well as other electrical and mechanical components inside the flange assembly. Therefore, the preferred embodiment of the shielding device should feature an access door large enough to permit all electrical, mechanical and maintenance functions up to, but not including, breach of the control rod drive flange. Included, without limitation, within such functions, would be removal of the position indicating probe housing and uncoupling of the control rod drive itself, without substantially compromising the radiation shielding performance or the mechanical integrity of the shielding device.

15. The shielding device should be designed to limit its own potential for radioactive contamination as well as help control its spread. The shielding device should provide passive protection of the flange assembly to which it is attached from any radioactive contaminants which might be released by the breach of an adjacent control rod drive flange.

16. The shielding device should not become a source of radiation itself. Construction of the device and its independent members should be water-tight and should be of materials which resist corrosion and which will not develop cracks or crevices.

17. If lead is employed as the shielding material, because of its superior shielding performance, it should be completely encapsulated within a shell to avoid any potential for exposure of the under-vessel workers to lead.

18. The shielding device should be designed for use while the reactor is in the Shutdown or Refuel state.

19. The shielding device should be serviceable after repeated decontamination procedures and during and after repeated exposure to the following boundary conditions:
Temperature: 212° F. (Hot Decontamination)
Humidity: 100%

20. The shielding device should be of durable construction and should withstand such abuse as dropping and throwing without deformation or loss of function. Exposed mechanisms should be protected, as by a bumper.

21. The shielding device should be designed so that any detachable parts or components which are removed are completely interchangeable with those of other shield devices.

22. The shielding device should be designed and fabricated so that, while installed, it resists the accumulation of fluids that could splash onto workers during its removal.

23. The shielding device should not require any permanent modification of existing under-vessel equipment for the purpose of attachment.

In the simplest form of the present invention shielding material, in the form of sheets of lead plate, was hung in a form of chain framework suspended from the control rod drive housing support members. The individual sheets were about one-quarter inch in thickness and measured about two feet by four feet. However, in testing this embodiment, when the third sheet of lead was positioned within the framework, the assembled weight became too great for the framework and the hanging means failed.

While this embodiment demonstrated the shielding function and while an array of such assemblies was able to provide substantially complete overhead coverage, most of the other design criteria set out above were not met. In particular, the support members could not be removed and access to the control rod drive was limited and difficult. Further, because such an assembly hung below the support members, head room in the under vessel maintenance area was severely, if not critically, limited.

Another simplistic embodiment of the present invention, consists of lead disks approximately one to one and one-quarter inch thick and ten to eleven inches in diameter. These crude disks were suspended from the top surface of each flange assembly by a pair of bent carbon steel rods. This crude design, lacking most of the features of the preferred embodiment, was sufficient to allow testing to demonstrate the feasibility and the shielding potential of this type of under-vessel shielding. In such a test, an average dose reduction of roughly 60% was achieved immediately below a $3 \times 3$ array of flange assemblies fitted with such disks.

Since the intensity of radiation diminishes with the square of the distance, the highest level of exposure would be expected to be encountered immediately below the control rod drive flanges. Dosimeter equipment is typically worn on the heads of under-vessel maintenance workers for this reason.

A slightly more sophisticated embodiment of the present invention employs a disk which is $9\frac{3}{8}$ inches in diameter and $1\frac{1}{4}$ inches in thickness. This disk was first suspended from the top surface of the flange assembly by triangular gusset pieces welded to the tops of a pair of carbon steel bars. The spring action of the steel bars is relied upon to initially locate the triangular pieces on the top of each flange assembly.

Once the disk is located in this position, carbon steel rods are inserted through the lead disk, through pipe tracks welded to the inner surface of the suspension bars. The tops of these rods are positioned into the sockets of two opposite capscrews on the undersurface of the flange assembly, and the rods are then locked in that position. The design also features a slot in the lead disk for the probe cable of the control rod drive and this slot can be closed after installation by a lead door mounted to the disk with a hinge.

While the design is easy and rapid to install, removal presents a more difficult problem because the steel bars are required to be pulled apart, a difficult maneuver in view of the limited access space between the flange assemblies. Further, although the design is fairly stable it can be dislodged from the flange assembly by a sharp blow. Several other desirable design criteria are not met by the design.

Another embodiment is more similar in form to the preferred embodiment of the present invention. Actually three slightly different versions of the same embodiment were prepared and tested. In each case, the shielding device is divided into two half shields and employs shells of stainless steel to enclose the flange assembly and stainless steel jacketing to completely enclose the lead shielding material. Only the method of attachment differs in the three versions. The first version attaches with a first contact point which is an inward-facing lip on the top of the stainless-steel shell, and this lip rests on the top of the flange assembly. A second contact employs a shaft driven arcuate-shaped flat retaining plate which is positioned between the underside of the flange and the heads of one or more of the capscrews. This plate is held in place by a hasp lock on the lower edge of the shell. In addition, the first version employs a pair of latching cross-ties on lower portion of each shell to allow the two half shields to lend stability to each other.

This method of mounting is not completely secure and the unit could swing, pivoting on the lower edge of the flange assembly, far enough to remove the first contact point from the top of the flange assembly. While this would not present a problem once both units were positioned and cross-connected, it requires a worker to hold one half-shield in place while positioning another. The same problem re-occurs in removal of the shields.

The second version of this embodiment employs a third contact point, an inward facing wall on the interior surface of the stainless-steel shell. This wall acts as a spacer and prevents the unit from swinging. However, the attachment of the unit is still too tight and although serviceable, tended to rattle.

The final version of this embodiment was similar in every respect except that the second contact point was changed from the flat plate to a wedge shape. The wedge was not simply positioned between the capscrew heads and the flange, but was tightened into that position with a threaded shaft and a crank. This method of attachment allowed for the variations in dimension from flange to flange of the various control rods and the fabrication differences from shielding member to shielding member and enabled a secure attachment which could not be disengaged.

In the following description of the preferred embodiment, it should be remembered that the previously described embodiments all served the primary function, shielding under-vessel workers, more or less as well as the preferred embodiment. The preferred embodiment, however, performs this shielding function and more completely meets the other expressed design criteria set out above.

In the preferred embodiment, the shielding device of the present invention is comprised of two half shields or shielding members. One of these shielding members is shown as (32) in FIG. 3. This shielding member (32) is shown in a view which is partly broken away to allow view of the shielding material (34) which is shaded in the figure. In the complete shielding member (32), these shaded areas of shielding material (34) would be completely enclosed. The shielding member consists generally of a cylindrical outer wall (36), a first cylindrical inner wall (38), an outer bottom wall (40), an inner bottom wall (42), and an annular upper interior wall (43). These walls, together with the walls covering the shielding material (34) which are shown, surround and enclose the shielding material (34), in the form of a partial cylindrical chamber (44) and a partial annular chamber (46).

In the preferred embodiment, the shielding member is provided with attachment means comprising three points of contact. The first point of contact (60) is comprised by an inward facing rim or lip which is intended to rest on the top surface of the control rod drive housing flange (20).

The second point of contact (62) comprises a wedge-shaped arcuate member (64) which can be vertically adjusted by some means such as the threaded drive shaft (66) and a cranking means (68). When properly positioned, said wedge-shaped arcuate member (64) can be held in position by securing the cranking means (68) with locking means (70). As mentioned previously, this adjustable wedge-shaped arcuate member (64) allows each shielding member (32) to be securely and positively attached to any flange assembly (16) of any control rod drive (12) despite small differences in dimension from one flange assembly to another and from one shielding member to another shielding member.

The third point of contact (72) consists of an annular interior wall (74) which extends inward to contact the control rod drive flange (22) when the shielding member (32) is properly positioned. In the preferred embodiment, this annular interior wall (74) is actually a continuation of the annular upper interior wall (43). This is primarily a matter of convenience in construction, however, and the annular interior wall (74) could be positioned equally advantageously at any position on the interior of the outer wall (36) or the first cylindrical inner wall (38) so long as it would be in contact with the control rod drive flange assembly (16). Further, there is no requirement that the third point of contact (72) be a continous wall, so long as satisfactory supportive contact is made.

Figures 4, 5:
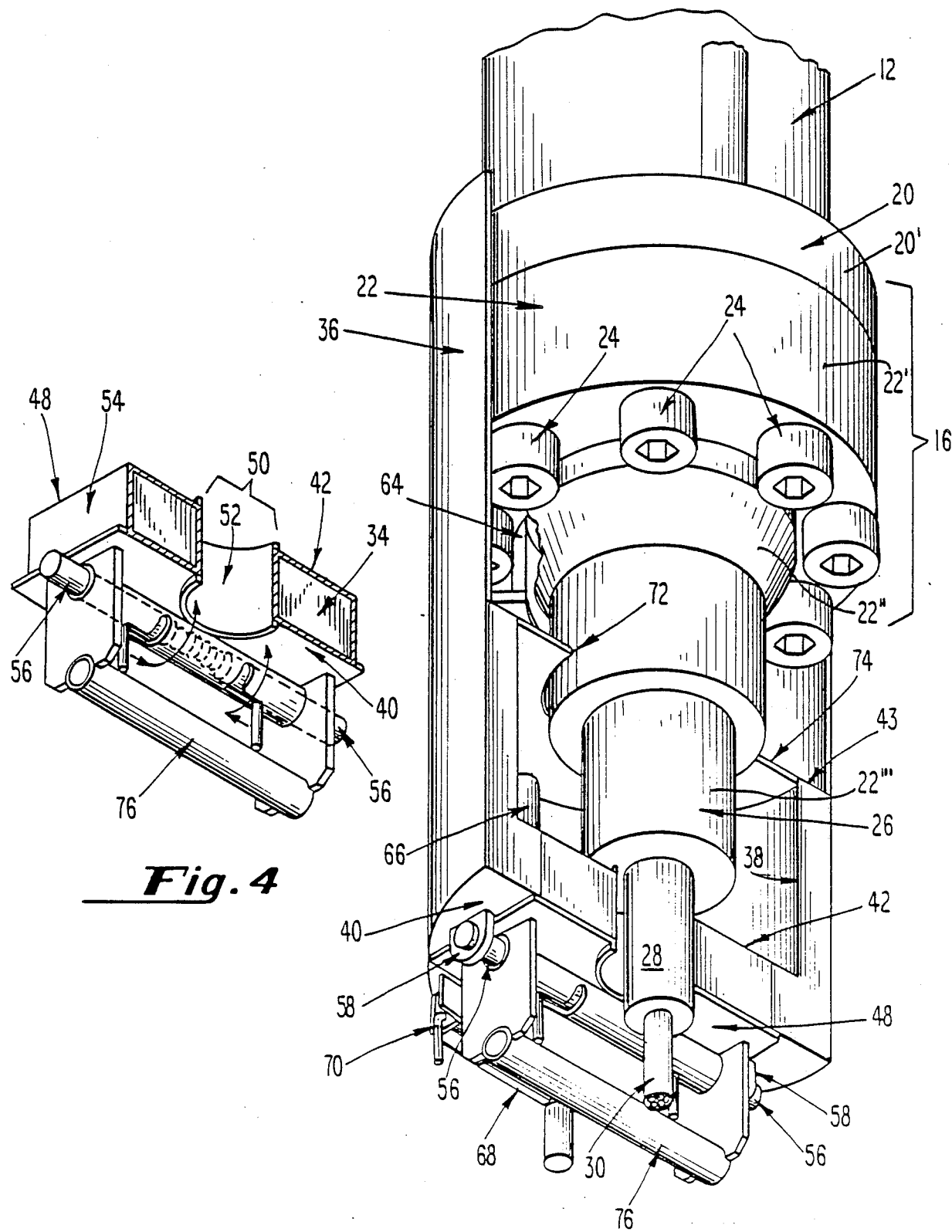
FIG. 4 is a partly broken away view of a detachable integral access door of a shielding member.
FIG. 5 shows a control rod drive in the area of the control rod drive flange assembly having a shielding member, shown in a partly broken away view, in place.

Integral to the shielding member (32) of FIG. 3, but detachable and detached from the shielding member (32) shown in FIG. 3, is an access door (48) shown in FIG. 4. This access door (48) engages in intimate contact as part of the shielding member (32) completing the partial annular chamber (46) of the shielding member (32). With continued reference to FIG. 4, the access door comprises a portion of the partial annular chamber (46), surrounding an opening (50) which would be central to the complete annulus. This opening is defined by the second cylindrical inner wall (52) which joins the outer bottom wall (40) and the inner bottom wall (42). Side walls (54) are necessitated by the removable nature of the access door (48) and serve to enclose the shielding material (34) as are similar walls of the mating surfaces which are not shown in the cut away view of FIG. 3.

In the preferred embodiment, the access door (48) is additionally provided with a lifting handle (76) which, when the access door (48) is attached, acts as a lifting handle for the entire shielding member. It should be apparent to one skilled in the art that such a handle could be located anywhere on the shielding member (32), but placement on the access door (48), which should have some form of handling means to ease in removal, is a matter of convenience. The present location of the lifting handle (76) also allows it to act as a bumper, to help protect the exposed mechanisms on the bottom of the shielding member (32) from inadvertent impacts. Also, the access door (48) as shown is roughly rectangular and when the access doors of mating shielding members are removed, the opening would be approximately square. One skilled in the art will recognize that such geometries are not necessary to the usefulness of the shielding device. Such doors could easily be triangular, yielding the same approximate square opening when mated, or semi-circular, yielding a circular opening. The geometry of the access door (48) is, therefore, a matter of choice.

The shielding member (32) together with its integral access door (48) is shown in position on a control rod drive flange assembly (16) in FIG. 5. The access door (48) is held in position by some mechanism such as the deadbolts (56) shown isolated in FIG. 4 and engaged in FIG. 5, engaging receptacles (58) of the shielding member (32).

As is shown clearly in FIG. 5, the shielding member (32) or half-shield, encloses one half of the lower terminus of a control rod drive. A second shielding member in mating contiguous engagement would enclose the other half.

It should be obvious to one skilled in the art that the choice of two half shields is a matter of convenience, and the shielding device could be divided into almost any number. As with any shielding device, the more shielding material which can be employed, the higher the amount of shielding which will be obtained. However, the need for the shielding device to be handled limits the amount each member of the shielding device can weigh. At the same time, the time required for installation and removal is a direct function of the number of members into which the shielding device is divided, and the added installation and removal time also represents additional exposure time for the worker. In fact, the installation and removal time, employing the shielding device of the present invention, is a period during which some of the highest exposure rates are incurred. Therefore, an unnecessary number of shielding members per shielding device can compromise the purpose of the device even though increased shielding will result. Two half-shields have been employed in the preferred embodiment in an attempt to position the maximum shielding material in the shortest period of time.

The installation procedure of the preferred embodiment of each member of the shielding device consists of only four simple steps. First, the first contact point (60) shown in FIG. 3, is positioned on the top of the control rod drive housing flange (20) shown in FIG. 2.

Second, while keeping the first point of contact positioned on top of the housing flange (20), the shielding member is swung in towards the flange assembly (16) until the third point of contact (72) shown in FIG. 3, is in contact with the control rod drive flange (22) shown in FIG. 2.

Third, the second point of contact (62) is positioned. This is done by raising the wedge-shaped arcuate member (64) using the cranking means (68) as shown in FIG. 3, or another mechanism, such as a spring, until it is firmly positioned between the bolting means (24) and the control rod drive flange (22) as shown in FIG. 2.

Finally, once the wedge-shaped member (64) is firmly positioned, the cranking means (68) of the threaded drive shaft (66) is secured in that position with locking means (70).

Installation of the mating shielding member follows the same procedure.

Lead has previously been mentioned as the shielding material and is employed in the preferred embodiment because of its cost and high efficiency as a shielding material. Various alternative materials could also be employed and examples of these are: iron or iron-bearing allows, such as stainless steel; depleted uranium; and concrete, especially high density concrete. In fact, any material having a suitable density could be employed.

Of course, if stainless steel were employed as the shielding material, there would be no requirement to completely encase it within another non-corrosive shell. In fact, the shell of the preferred embodiment could be manufactured as one or more stainless steel castings. No. 316 Stainless has been used in the preferred embodiment for a number of reasons including but not limited to its non-corrosive nature, structural properties, shielding potential, workability durability, cost and availability. Other grades of stainless steel could easily be employed as well as aluminum, titanium, and high-impact plastics as well as painted or plastic coated corrodible metals.

In choosing a material for use as a housing material, one must review the design criteria set out above and choose the material which will best satisfy those criteria which are believed to be the most important.

It should also be apparent to one skilled in the art that a collar of shielding material could be placed as a jacket surrounding the control rod drive flange (22) and attached by using longer cap screws. Such a construction would be of a more permanent nature and would interfere with the support members (14) as presently designed. However, such a design would meet most of the design criteria above and is certainly within the contemplation of the present invention. Provision of such collars as permanent attachments in the nature of a retrofit or redesign of the present control rod drive flange itself would require a re-calculation of the allowable weight loads and redesign of the structural members, but would reduce exposure times by not requiring installation and removal.

The effectiveness of the shielding devices of the present invention was recently demonstrated in a large boiling water reactor. The tests and measurements taken were intended to investigate the ability of the shielding devices to reduce the effective under-vessel dose rates while subject to conditions normally experienced during a typical refueling outage. Shielding devices were installed on each of the control rod drive flanges, and the under-vessel outage work was performed in an otherwise normal manner. The under-vessel dose rates before and after the installation of the shielding devices, the manpower and additional dose required to install and remove the shielding devices, and the actual doses received by the under-vessel workers were all measured. This information was used together with projections based upon previous experience at the plant to determine the net reduction in under-vessel man-rem expenditure that is attributable to the use of the shielding devices. The following table summarizes the results:

| Measurement Point | Average Reduction | Reduction In Maximum Dose Rate |
| --- | --- | --- |
| Head (6 ft. above floor) | 72% | 71% |
| Waist (3 ft. above floor) | 59% | 64% |
| Floor | 52% | 57% |
| Reduction in Median Effective Worker Dose Rate (man-rem/man-hour) = 53% | | |

Other features, advantages and specific embodiments of this invention will become readily apparent to those exercising ordinary skill in the art after reading the foregoing disclosures. These specific embodiments are within the scope of the claimed subject matter unless otherwise expressly indicated to the contrary. Moreover, while specific embodiments of this invention have been described in considerable detail, variations and modifications of these embodiments can be effected without departing from the spirit and scope of this invention as disclosed and claimed.

What is claimed is:

1. In a boiling water nuclear reactor having an under-vessel area with a plurality of downwardly extending control rod drives below the vessel, each control rod drive having a flange assembly that is a source of radiation and comprising a control rod drive housing flange having a base and a mating control rod drive flange having a base, with the flanges in each assembly being joined together at their bases by connecting means, and usually having position indicating apparatus extending through the flange assemblies, with the areas beneath the flange bases each defining an underflange zone proximate the source of radiation, a shielding device capable of being mounted and demounted relative to a said zone and comprising:
   (a) a structure for disposition around said flange bases;
   (b) said structure being configured to substantially surround said zone in its mounted condition;
   (c) attachment means associated with said structure, for mounting and demounting the structure relative to said flange assembly;
   (d) an amount of shielding material sufficiently effective to substantially reduce the measured radiation dose rate emanating from said zone; and
   (e) with said shielding material comprising at least a portion of said structure.

2. The shielding device of claim 1, wherein said structure has an upper end and a lower end, and said attachment means is carried at least in part by said upper end of said structure.

3. The shielding device of claim 2 wherein said attachment means includes at least one inwardly facing lip means for resting on the base of the drive rod housing flange.

4. The shielding device of claim 1, wherein said structure comprises a plurality of components which, when assembled in mating contiguous relation, comprise the structure.

5. The shielding device of claim 4, wherein each said component comprises a radial segment of said structure.

6. The shielding device of claim 5, including securement means for securing said segments in said mating contiguous relation.

7. The shielding device of claim 1, wherein said structure has an upper end and a lower end and wherein said structure has a generally flat lower end comprised in substantial part of shielding material.

8. The shielding device of claim 1, wherein said structure has an upper end and lower end, and wherein said structure includes a generally cylindrical portion near the lower end, comprised in substantial part of shielding material.

9. The shielding device of claim 7, wherein said structure includes a generally cylindrical portion near the lower end, comprised in substantial part of shielding material.

10. The shielding device of claim 4, including separate attachment means for each said component.

11. The shielding device of claim 5, wherein each said component is of substantially equal size and weight.

12. The shielding device of claim 11, wherein there are two said components.

13. The shielding device of claim 1, wherein said shielding material is enclosed within a shell of corrosion-resistant metal.

14. The shielding device of claim 13, wherein the shell is composed of walls having a thickness of between five one-hundredths of an inch (0.05 in.) and one inch.

15. The shielding device of claim 5, wherein the attachment means of each component is self-aligning upon being mounted.

16. The shielding device of claim 5, including separate attachment means for each component, wherein said attachment means includes an upwardly adjustable wedge-shaped member which can be positioned between the control rod drive flange and the connecting means upon mounting each segment.

17. A shielding device of claim 5, wherein there are separate attachment means for each said component, and wherein said attachment means includes means for engaging each said segment against lateral movement.

18. The shielding device of claim 17, including locking means for said engaging means for locking said engaging means in place.

19. The shielding device of claim 11, wherein said structure has an upper end and a lower end, and said attachment means is carried at least in part by said upper end of said structure.

20. The shielding device of claim 7, wherein said generally flat lower end of said structure is provided with a generally central opening for accommodating bottom entry position indicating apparatus.

21. The shielding device of claim 20, including access door means in said flat lower end of said structure, contiguous to said central opening.

22. The shielding device of claim 4, including handle means carried by each said component for carrying said component.

23. The shielding device of claim 5, wherein said structure has an upper end and a lower end, and said attachment means is carried at least in part by said upper end of said structures; wherein said attachment means includes a first attachment means for engagement with the base of the drive rod housing flange and second attachment means for engaging each said segment against lateral movement.

24. The shielding device of claim 23, including means for clamping each said segment in tension on the flange assembly between first and second attachment means of each said segment.

25. In a boiling water nuclear reactor having an under-vessel area with a plurality of downwardly extending control rod drives below the vessel, each control rod drive having a flange assembly that is a source of radiation and comprising a control rod drive housing flange having a base and a mating control rod drive flange having a base, with the flanges in each assembly being joined together at their bases by connecting means, and usually having position indicating apparatus extending through the flange assemblies, with the areas beneath the flange bases each defining an underflange zone proximate the source of radiation, a shielding device capable of being mounted and demounted relative to a said zone and comprising:
(a) a structure for disposition below said flange bases;
(b) said structure being configured to substantially underlie said zone in its mounted condition;
(c) attachment means associated with said structure, for mounting and demounting the structure relative to said flange assembly;
(d) an amount of shielding material sufficiently effective to substantially reduce the measured radiation dose rate emanating from said zone; and
(e) with said shielding material comprising at least a portion of said structure.

26. The shielding device of claim 25, wherein said structure has an upper end and a lower end, and said attachment means is carried at least in part by said upper end of said structure.

27. The shielding device of claim 26, wherein said attachment means includes at least one inwardly facing lip means for resting on the base of the drive rod housing flange.

28. The shielding device of claim 25, wherein said structure comprises a plurality of components which, when assembled in mating contiguous relation, comprise the structure.

29. The shielding device of claim 28, wherein each said component comprises a radial segment of said structure.

30. The shield device of claim 29, including securement means for securing said segments in said mating contiguous relation.

31. The shielding device of claim 25, wherein said structure has an upper end and a lower end and wherein said structure has a generally flat lower end comprised in substantial part of shielding material.

32. The shielding device of claim 25, wherein said structure has an upper and end and a lower end, and wherein said structure includes a generally cylndrical portion near the lower end, comprises in substantial part of shielding material.

33. The shielding device of claim 31, wherein said structure includes a generally cylindrical portion near the lower end, comprised in substantial part of shielding material.

34. The shielding device of claim 28, including separate said attachment means for each said component.

35. The shielding devices of claim 29, wherein each said component is of substantially equal size and shape.

36. The shielding device of claim 35, wherein there are two said components.

37. The shielding device of claim 25, wherein said shielding material is enclosed within a shell of corrosion-resistant metal.

38. The shielding device of claim 37 wherein the shell is composed of walls having a thickness of between five one-hundredths of an inch (0.05 in.) and one inch.

39. The shielding device of claim 29, wherein the attachment means of each said component is self-aligning upon being mounted.

40. The shielding device of claim 29, including separate said attachment means for each said component, wherein said attachment means includes an upwardly adjustable wedge-shaped member which can be positioned between the control rod drive flange and the connecting means upon mounting each said segment.

41. A shielding device of claim 29, wherein there are separate said attachment means for each said component, wherein said attachment means includes means for engaging each said segment against lateral movement.

42. The shielding device of claim 41, including locking means for said engaging means for locking said engaging means in place.

43. The shielding device of claim 41, wherein said structure has an upper end and a lower end, and said attachment means is carried at least in part by said upper end of said structure.

44. The shielding device of claim 31, wherein said generally flat lower end of said structure is provided with a generally central opening for accommodating bottom entry position indicating apparatus.

45. The shielding device of claim 44, including access door means in said flat lower end of said structure, contiguous to said central opening.

46. The shielding device of claim 28, including handle means carried by each of said component for carrying said component.

47. The shielding device of claim 29, wherein said structure has an upper end and a lower end, and said attachment means is carried at least in part by said upper end of said structures; wherein said attachment means includes a first attachment means for engagement with the base of the drive rod housing flange and second attachment means for engaging each said segment against lateral movement.

48. The shielding device of claim 47, including means for clamping each said segment in tension on the flange assembly between first and second attachment means of each said segment.

* * * * *